United States Patent [19]

Tarnowski et al.

[11] Patent Number: 4,518,898
[45] Date of Patent: May 21, 1985

[54] METHOD AND APPARATUS FOR CORRECTING IMAGE DISTORTIONS

[75] Inventors: Andrew A. Tarnowski, New Caanan; Brian G. Anderson, Fairfield, both of Conn.

[73] Assignee: Image Graphics, Incorporated, Fairfield, Conn.

[21] Appl. No.: 468,045

[22] Filed: Feb. 22, 1983

[51] Int. Cl.³ .............................................. H01J 29/56
[52] U.S. Cl. .................................................... 315/371
[58] Field of Search ............... 315/370, 371, 382, 393, 315/394, 395

[56] References Cited

U.S. PATENT DOCUMENTS

| | | |
|---|---|---|
| 2,617,059 | 11/1952 | Neeteson . |
| 2,820,175 | 1/1958 | Fubini . |
| 3,341,735 | 9/1967 | Briggs . |
| 3,465,137 | 9/1969 | Brouillette, Jr. et al. . |
| 3,501,669 | 3/1970 | Henderson . |
| 3,723,805 | 3/1973 | Scarpino et al. . |
| 3,772,566 | 11/1973 | Schwartz ............................. 315/393 |
| 4,142,132 | 2/1979 | Harte . |
| 4,159,484 | 6/1979 | Strathman ............................ 358/10 |

Primary Examiner—Theodore M. Blum
Attorney, Agent, or Firm—Roland T. Bryan

[57] ABSTRACT

A method and apparatus are described for improving the geometric fidelity of images reproduced in a charged particle beam device. The beam is deflected across a sensitive medium to form a test image of predetermined configuration. The test image is compared with a reference image and geometric deviations measured, at a number of points, are used to calculate correction signals required to modify the beam deflection to offset the deviations. Circuit adjustments are then made to provide the calculated correction signals. The correction signal adjustments are accomplished in separate non-interactive circuits for each of a plurality of predetermined corrections which only require a one time adjustment.

23 Claims, 8 Drawing Figures

METHOD AND APPARATUS FOR CORRECTING IMAGE DISTORTIONS

BACKGROUND OF THE INVENTION

1. Field of the Invention

This invention relates generally to deflection systems in a charge particle recording apparatus. The invention relates more particularly to deflection systems requiring a high degree of deflection accuracy and to an improved method and apparatus for enhancing the scanning linearity of a charged particle beam in a recording apparatus and for improving the geometric fidelity of the reproduced image.

2. Description of the Prior Art

A scanning charged particle beam is often used to produce an image with informational content. Various well-known uses include television receivers, video displays, recording devices and the like. An image recorded by a scanning charge particle beam is not precisely reproduced, but rather is subject to distortions resulting from various factors including those introduced by the scanning beam reproduction device itself. Distortions can result from drive signal distortion, variations in construction of deflection yokes and electrostatic plates, variations in orientation and position of yokes and deflection plates, variations in electron guns, etc. While the quality of image reproduction is sufficiently high to satisfy the needs of many such uses, certain applications of charged particle scanning systems require that beam scanning be conducted with substantially reduced distortion in order to attain a desired relatively high fidelity in reproduced image information. An electron beam recording system utilized to reproduce geophysical information in connection with petroleum field exploration is an example of one such application requiring relatively high fidelity in a reproduced image.

Various techniques have been employed to reduce distortions which are introduced into the reproduced image by the beam scanning device itself. The distortions principally comprise geometric and other distortions which are revealed by distortions in the reproduced image. Such distortions are unacceptable in applications requiring high geometric fidelity.

It is known in prior linearity correcting arrangements, to generate a correction signal in order to reduce distortion. However, such prior art does not provide the relatively high degree of linearity desired for certain applications. Moreover, those circuit arrangements provided for producing the correcting signal have multiple adjustments, many of which are interactive thus requiring repeated readjustment and causes the set-up of the scanning system to be a laborious, tedious and costly procedure.

In another linearity correcting arrangement, a diode matrix is utilized which provides a relatively large number (e.g., 81) of matrix intersections at which voltage deviations are determined. Adjustments are made to a large number of potentiometers which are coupled in circuit with the diodes to cause the beam to more accurately scan a linear trace. While this arrangement provides some degree of linearity correction, the numerous potentiometers are interactive and must be repeatedly readjusted. This adjustment is substantially time consuming, tedious and costly.

SUMMARY OF THE INVENTION

Accordingly, it is an object of this invention to provide an improved method and apparatus for enhancing scanning linearity of a charged particle beam.

Another object of the invention is to provide for improved geometric fidelity of a reproduced image.

A further object of the invention is to provide an improved method and apparatus which effects a relatively high degree of scanning linearity and which is accomplished substantially without readjustment of circuit components after an initial setting.

A still further object of the invention is to provide an improved method and apparatus which increases the accuracy of correction of a scanning charged particle beam, expedites the correction procedure, and reduces the overall cost of the system.

Another object of the invention is to provide an improved method and apparatus for enhancing scanning linearity in an electron beam recorder.

In practicing the method of this invention for enhancing scanning linearity of a charged particle beam in a recording apparatus, and improving the geometric fidelity of a reproduced image, a charge particle sensitive medium is positioned in the path of a charged particle beam in the apparatus. The medium is adapted to retain a permanent image which is formed thereon by the beam. Included in the apparatus is a means for deflecting the particle beam in response to a deflection signal. A test pattern image having a predetermined configuration is formed on the medium by deflecting the beam across the medium. The test image thus formed is compared with a reference alignment image of the same predetermined configuration and any spatial deviation which exists between the test and reference images at predetermined corresponding locations on the images is measured. Typically, the reference alignment image is a precisely predetermined pattern on a stable medium (e.g. glass), but could also be incorporated upon less stable mediums (e.g. film, etc.). Also included in the apparatus is a circuit means for providing an electrical correction signal of adjustable amplitude and for combining the correction signal with the deflection signal. The amplitude of an electrical correction signal for a measured deviation is determined. A correction signal of predetermined amplitude, when combined with the deflection signal, will alter the path of the scanning particle beam to thereby reduce the measured spatial deviation. The circuit means is then adjusted to provide an electrical correction signal of predetermined amplitude which reduces the spatial deviation.

In accordance with more particular features of the invention, the correction signal is a composite signal which is formed by a plurality of correction signal components, each of which corresponds with a geometric deflection distortion. The circuit means includes a plurality of adjustable circuit members each of which is associated with a correction signal component for varying its amplitude. Spatial deviation is determined by measuring the deviation for a particular deflection distortion at several corresponding locations on the images. The required amplitude of a correction signal component for reducing the measured deviation is calculated. Adjustment of a circuit member is then performed for each correction signal component for which a corresponding spatial deviation has been determined to exist. The magnitude of the signal component is monitored until the calculated amplitude is attained. In a preferred embodiment, the charged particle beam is deflected to form a test pattern configuration having a plurality of intersecting lines on the medium and the medium is then removed from the apparatus and compared with the reference image configuration.

In accordance with features of the apparatus of the invention, a circuit arrangement for enhancing scanning linearity in a charged particle beam deflection apparatus, and for improving the geometric fidelity of a reproduced image comprises a source of $X_{in}$ and $Y_{in}$ deflection signals, a beam deflection means for deflecting a charged particle beam upon the application of the deflection signals thereto, and a circuit means for coupling the $X_{in}$ and $Y_{in}$ signals to the deflection means for causing deflection of the particle beam. A correction circuit means is provided which derives $C_x$ and $C_y$ correction signals from the $X_{in}$ and $Y_{in}$ deflection signals which are coupled thereto. The correction signals are composite signals each of which includes a plurality of correction signal components and each of said components corresponds to a particular deflection distortion. The correction circuit means includes multiplier circuit means which derive second and higher order signal components from the input deflection signals and combine the input and derived signals to provide a plurality of correction signal components. A plurality of adjustable circuit members is included in the correction circuit means, each of which is associated with a correction signal component for varying its amplitude. The adjustable circuit members are connected in the circuit for varying the amplitude of the correction signal component after signal multiplication has been accomplished thereby reducing circuit interaction upon adjustment of one or more adjustable members. A means is provided for combining the correction signals with the deflection signals to effect the correction of distortion in the scanning beam.

BRIEF DESCRIPTION OF THE DRAWINGS

These and other objects and features of the invention will become apparent with reference to the following specification and to the drawings wherein.

DETAILED DESCRIPTION

Figure 1:
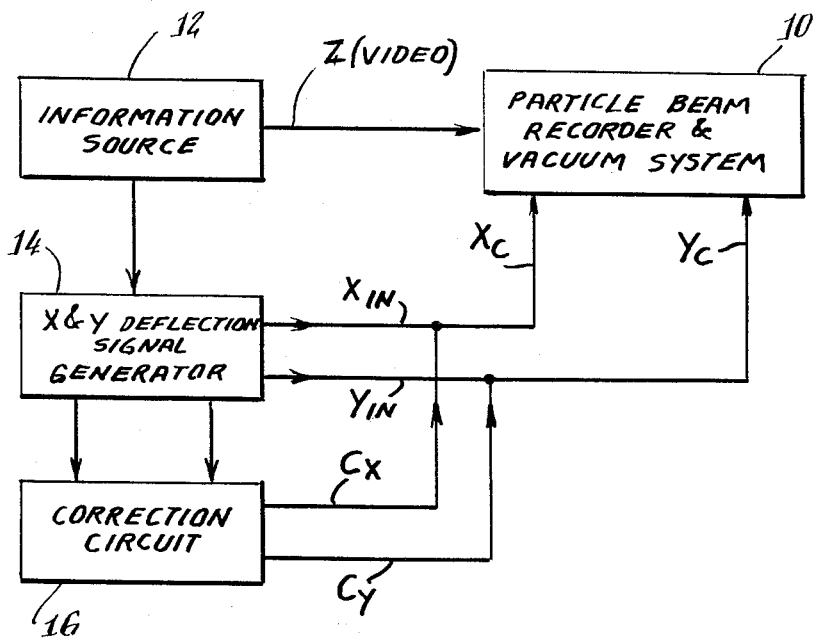
FIG. 1 is a block diagram of an apparatus constructed in accordance with features of the invention and with which the method of the invention is practiced.

Referring now to FIG. 1, the generalized block diagram of a particle beam scanning system is shown to comprise a recording system and includes a particle beam envelope and a vacuum system, both of which are represented generally by the block 10. Information to be recorded is provided in electrical form by a source 12. Such information may comprise, for example, geophysical information relating to the earth's subterranean layers—information which is valuable in searching for crude oil deposits and other sources of fuel. Such information is generally accumulated in analog form, converted to digital form, and recorded for storage on magnetic tape to be subsequently visually reproduced. The visual image is created by intensity modulating a scanning particle beam in the envelope 10 which forms the image on a particle beam sensitive medium 32. While geophysical data is an example of one type of information, such information can also be derived from other different sources and relate to other technologies. A source 14 provides deflection signals, referred to throughout this specification as $(X_{in}, Y_{in})$ which deflect the particle beam in mutually perpendicular directions across the sensitive medium. While the preferred embodiment is described as to conventional X and Y beam deflection, it is also recognized that the deflection and hence corrections are in one direction with movement in the other direction being performed by a separate means (e.g. a synchronized film transport means). While this scanning is preferably highly linear to provide geometric fidelity in reproduction of image information, nevertheless distortions do arise during the scanning procedure. The scanning distortions operate to distort the geometric fidelity of reproduced information and detract from the informational content of the reproduced image. A correction circuit means 16 is provided which provides two composite output correction signals, $(C_x, C_y)$, which are combined with the deflection signals $(X_{in}, Y_{in})$, as described in greater detail hereinafter, and operate to desirably reduce scanning distortion and substantially enhance scanning linearity to an order of about 0.01% distortion.

Figure 2:
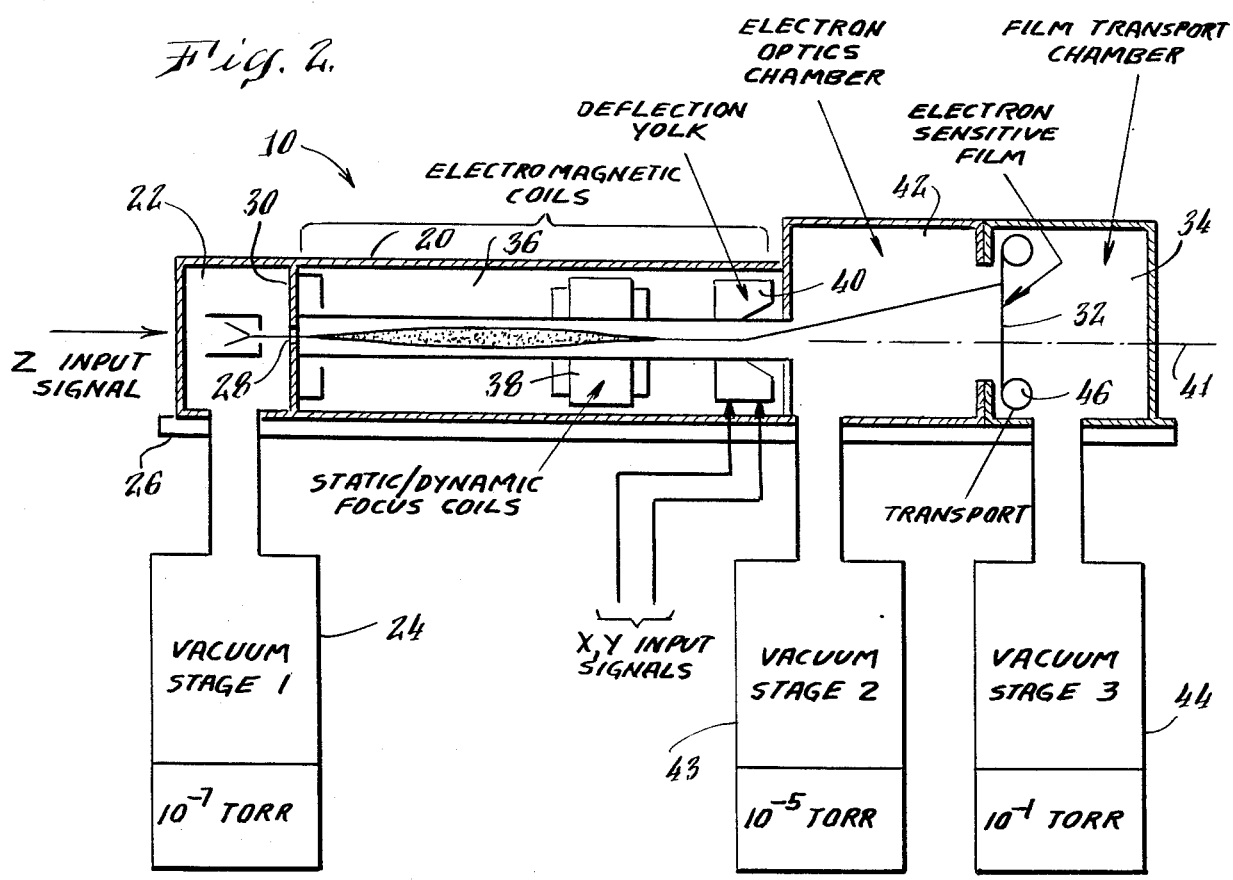
FIG. 2 is a view of a charged particle recorder envelope and vacuum system used with the apparatus of FIG. 1 in practicing the method of this invention.

FIG. 2 illustrates in greater detail the particle beam recorder and vacuum system 10 of FIG. 1. The particle beam recorder of FIG. 2 comprises an envelope 20 having four chambers. A first chamber 22 which houses an electron gun 26 is evacuated by a pumping means 24 to a pressure on the order of $10^{-7}$ Torr. The electron gun 26 generates negatively charged electron particles for the device. Electron particles from the gun 26 are accelerated through an aperture 28 in a plate 30 toward an electron sensitive medium 32 which is positioned in a distant chamber 34. The accelerated electron particles traverse a beam focusing and deflection chamber 36 having static and dynamic focusing coils 38 which operate to focus the diverging electron particles into a relatively narrow beam 39. The focused beam 39 is deflected in mutually perpendicular directions by a varying electromagnetic field established by a deflection yoke 40. The deflection yoke 40 includes a first current winding 74, FIG. 6, for causing deflection of the beam in a vertical direction along the Y axis and a second current winding 54, FIG. 6, for simultaneously causing deflection of the beam in a horizontal direction along the X axis. Deflection input signals, which have been corrected to compensate for nonlinearities in scanning, are coupled to the Y axis current winding 74 and to the X axis current winding 54. Both the X and Y signals may be linear ramp signals, the uncorrected X signal recurring periodically and having a sawtooth wave form 56, FIG. 6, while the uncorrected Y signal 68, FIG. 6, will generally exhibit a single ramp during the exposure of an image. In the absence of X and Y deflection signals, the beam will be accelerated toward the medium 32 along an optical axis 41, FIG. 2. This axis comprises a reference position from which the beam is deflected. The scanning electron beam is accelerated through an electron optics chamber 42 which is evacuated by a pumping means 43 to a vacuum level on the order of $10^{-5}$ Torr. The chamber 34 is similarly evacuated by a pump 44 but to a relatively lesser vacuum which is on the order of $10^{-1}$ Torr. Particle sensitive medium 32 may be provided in roll form in which case a medium transport 46 is positioned in the chamber 34 adjacent the electron optics chamber and is adapted to advance and position a segment of the roll in the path of the scanning electron beam. Alternatively, the medium may comprise a plate or slide which is positioned in the path of the beam. When the transport 46 is utilized, it is desirable to tension the medium and in accomplishing this, one technique, illustrated in FIG. 8, provides a tensioning which presents the medium 32 with a slightly convex rather than a planar surface to the optical axis 41 of the electron beam 39. Medium 32 is supported against and drawn along a curved surface 33 and conforms with the curvature of the surface. This curved surface is described in greater detail in U.S. Pat. No. 4,300,147, the disclosure of which is incorporated herein by reference. The curvature introduces a distortion in the scanning as is described hereinafter. An access port, not illustrated, provides access to the chamber 34 for removal and replacement of the transport 46 and medium 32. The three-stage vacuum system including the pumps 24, 43 and 44 provides the necessary low pressure in the gun chamber 22 while enabling the chamber 34 to be maintained at a relatively lesser vacuum thus facilitating pump down to the chamber vacuum after removal and replacement of the transport 46. The electron beam recorder described with respect to FIG. 2 is a commercially available unit. One such recorder is the EBR 2000 electron beam recorder which is commercially available from Image Graphics, Inc., of Fairfield, Conn.

The medium 32 which is sensitive to the particle beam can take various forms. In the electron beam recorder described, the medium may comprise a high resolution, fine grain, silver halide electron sensitive film which is processed by conventional wet chemistry after exposure to the electron beam. It may comprise a dry silver film which forms physical images by heat processing after exposure. It may also comprise direct recording films which form images directly upon exposure to electrons and requires no processing whatsoever. It may also comprise electrostatic films which are processed in toners. Each of these media is well known and commercially available. A preferred medium for the described electron beam recorder is a direct electron recording film such as type number SO-219 which is available from the Eastman Kodak Company of Rochester, N.Y.

The deflection yoke 40 of the device has a characteristic deflection sensitivity. It is preferable that the deflection sensitivity be substantially uniform across the area of the beam scan. The deflection sensitivity characteristic is described in terms of angular deflection in the X axis or Y axis direction for a predetermined increment of current flow in the associated X or Y winding. For a given, predetermined distance of the target medium 32 from the deflection yoke 40, the spatial deflection D of the beam 39 along the surface of the medium 32 can thus be determined for a given increment of deflection current $\Delta I$. This characteristic is utilized in determining the amplitude of a correction signal component as described hereinafter.

As indicated, the principal scanning distortions are in the form of geometric distortions which are introduced into the scanning process by various factors. These distortions occur in the direction of the X axis and in the direction of the Y axis and have a characteristic appearance which is recognizable to practitioners skilled in these arts. Distortions occurring in the direction of the X axis are skew, trapezoidism, differential linearity, bow, edge rotation, pincushion, edge bow and radial linearity. These distortions are correctable by first, second and third order correction signal components. The geometric distortions occurring in the direction of the X axis and corresponding correcting signal components are as follows:

TABLE I

| Distortion | Correcting Function |
|---|---|
| Skew | $Y$ |
| Trapezoidism | $XY$ |
| Differential Linearity | $X^2$ |
| Bow | $Y^2$ |
| Edge Rotation | $YX^2$ |
| Pincushion | $XY^2$ |
| Edge Bow | $X^2Y^2$ |
| Radial Linearity | $X^3$ | where X and Y are the deflection signals respectively.

In addition, the distortions of lesser magnitude and occurring in the direction of the X axis are correctable by higher order, power series correcting signal components. These distortions are identified by the order of the distortion rather than a geometrical description and are correctable by power series (McLaurin Series) correction signal components. The higher order distortions and corresponding correcting signal components are as follows:

| Distortion | Correcting Function |
|---|---|
| 5th Order | $X(X^2 + Y^2)^2$ |
| 7th Order | $X(X^2 + Y^2)^3$ |

Similarly, distortions occurring in the direction of the Y axis are rotation, trapezoidism, differential linearity, bow, edge rotation, pincushion, edge bow, and radial linearity. These distortions are correctable by first, second and third order correction signal components. The geometric distortion and corresponding correcting signal components are as follows:

TABLE II

| Distortion | Correcting Function |
|---|---|
| Rotation | $X$ |
| Trapezoidism | $XY$ |
| Differential Linearity | $Y^2$ |
| Bow | $X^2$ |
| Edge Rotation | $XY^2$ |
| Pincushion | $YX^2$ |
| Edge Bow | $X^2Y^2$ |
| Radial Linearity | $Y^3$ |

As with the X axis, distortions of lesser magnitudes occurring in the direction of the Y axis are also correctable by higher order, power series components. These distortions and the corresponding correcting signal components are as follows:

| Distortions | Correcting Function |
| --- | --- |
| 5th Order | $Y(X^2 + Y^2)^2$ |
| 7th Order | $Y(X^2 + Y^2)^3$ |

While the foregoing first, second and third order correcting signal functions correspond with a particular identifiable distortion, higher order correcting terms do provide for correction of distortions not visually identifiable. The correction circuit arrangement 16 (FIG. 1) derives the second and higher order correction signal components from the X and Y deflection signals. These correcting signal components are then combined with the deflection signals to reduce the indicated distortions and provide a resultant relatively low, nonlinear distortion which is on the order of about 0.01%.

Figure 6:
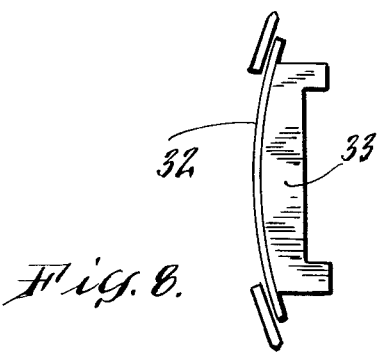
FIG. 6 is a schematic diagram of a deflection circuit arrangement used with the recording apparatus of FIG. 1 and which is constructed in accordance with features of the invention.
Figure 6:
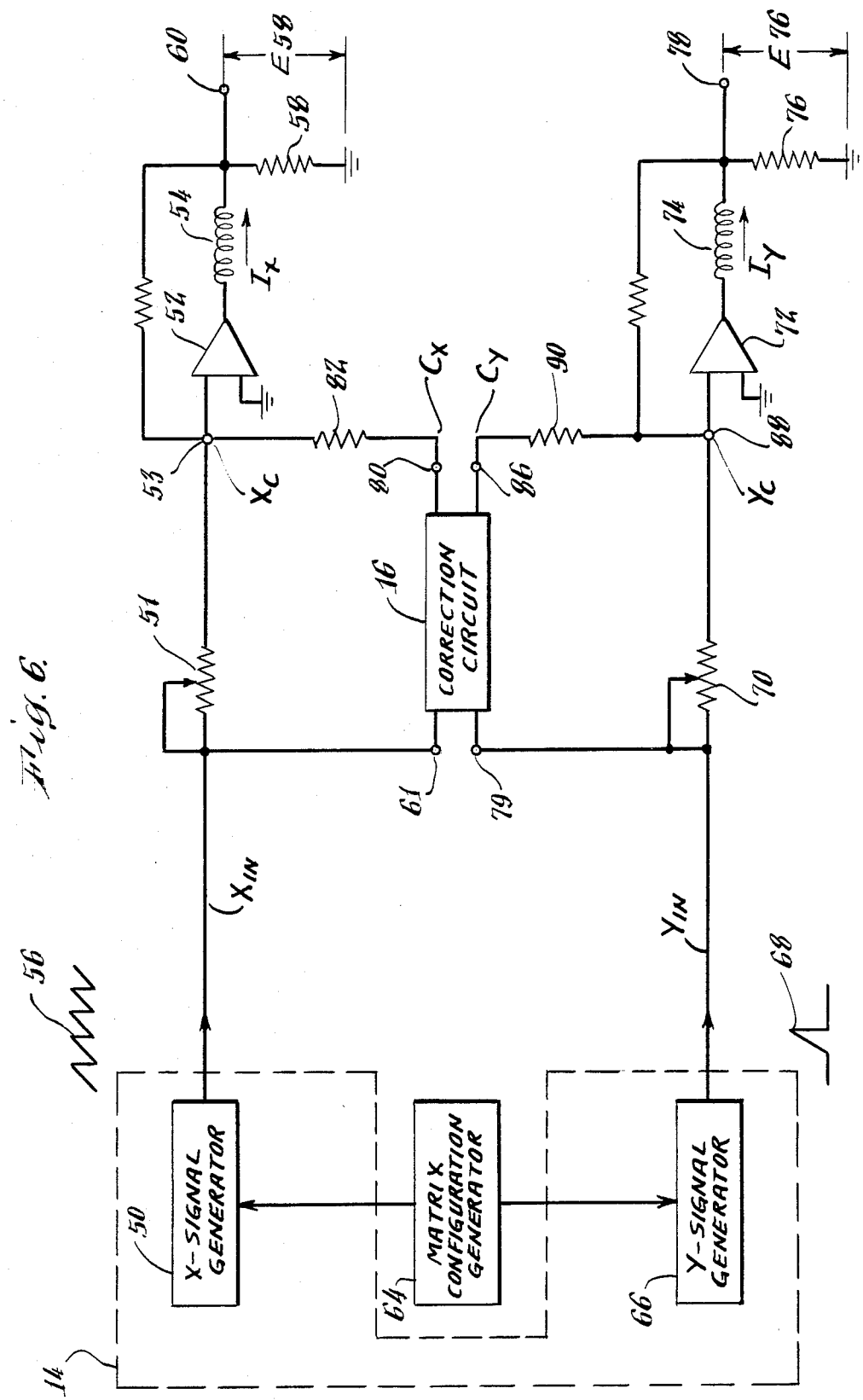

Referring now to FIG. 6, the deflection signal generator 14 of FIG. 1 which is represented in FIG. 6 within the dashed lines is shown to include an X axis deflection signal 56 source 50. An output signal from this source is coupled via a potentiometer 51 to summing terminal 53 of an amplifier 52, the latter amplifier providing an exciting current $I_x$ to the horizontal or X winding 54 of the deflection yoke 40 (FIG. 2). The X deflection signal 56 is generally of sawtooth configuration and causes an exciting current $I_x$ of sawtooth waveform to flow in the winding 54. Current $I_x$ flowing in the winding 54 also flows in a resistance 58. This resistance is a temperature stable impedance of predetermined magnitude, as for example 5 ohms. Current flowing in the winding 54 can be measured in terms of a voltage $E_{58}$ at a terminal 60. The deflection signal 56 of generator 50 is also coupled to an input terminal 61 of the correction circuit means 16 and to a test pattern generator 64. Similarly, a Y axis deflection signal generator 66 is provided which generates a ramp shaped output signal 68 which is coupled via potentiometer 70 to a summing terminal 88 of an operational drive amplifier 72. The signal from the source 66 causes an exciting current $I_y$ of ramp shaped configuration to flow in the winding 74 of the yoke. Current $I_y$ also flows in resistance 76. This resistance is a temperature stable impedance of predetermined magnitude, as for example 5 ohms. Current flowing in the winding 74 can be measured in terms of a voltage $E_{78}$ at a terminal 78. The Y axis signal from the source 66 is also coupled to an input terminal 79 of the correction circuit means 16 and to the matrix configuration generator 64. Correction circuit means 16 generates a composite X axis correction signal $C_x$ and provides this signal at an output terminal 80. The signal $C_x$ is coupled to the amplifier 52 via resistive impedance 82 and is combined at the summing terminal 53 with the deflection signal $X_{in}$ from the source 50. Similarly, this correction circuit means 16 generates a composite Y axis correction signal $C_y$ which is provided at an output terminal 86. This correction signal $C_y$ is coupled to the summing terminal 88 of the Y axis amplifier 72 via a resistive impedance 90 where it is combined with the deflection signal $Y_{in}$ from the signal source 66. The circuit arrangement illustrated adds the correction signal $C_x$ to the deflection signal $X_{in}$ and adds the correction signal $C_y$ to the deflection signal $Y_{in}$.

Figure 7:
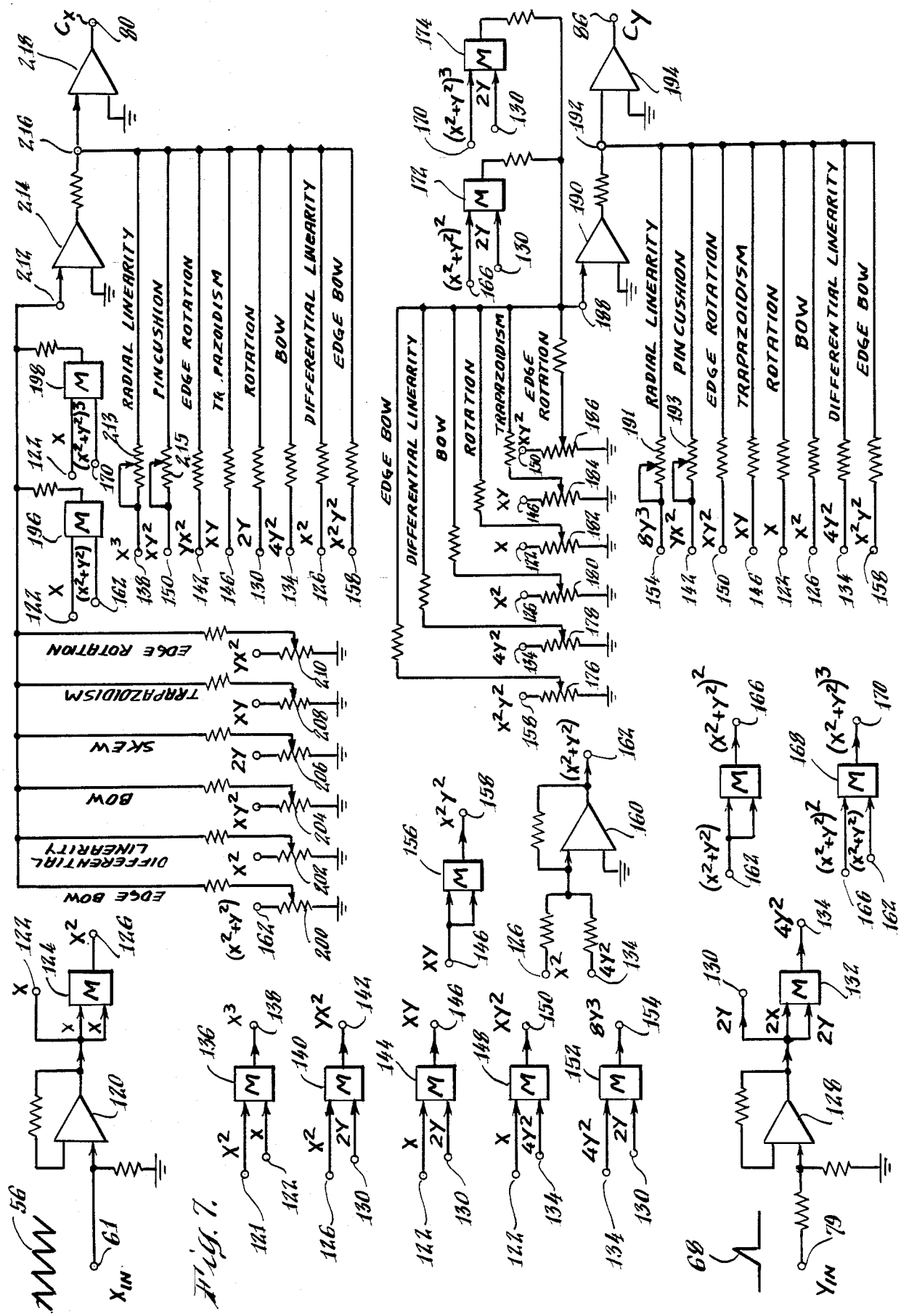
FIG. 7 is a schematic diagram of the correction circuit arrangement of FIG. 6; and, FIG. 8 is an enlarged, fragmentary view of a record medium and curvilinear support body.

Correction circuit 16 is shown in greater detail in FIG. 7. Input deflection signals $X_{in}$ and $Y_{in}$ at terminals 61 and 79 respectively of FIG. 6 are illustrated in FIG. 7. Wherefore the $X_{in}$ and $Y_{in}$ signals are divided into a plurality of parallel correction circuits with each arranged to produce a correction signal for a predetermined spatial deviation shown on said medium. The $X_{in}$ signal at terminal 61 is amplified by an operational amplifier 120 and is provided at an output terminal 122. The $X_{in}$ signal is also applied to multiplier circuit 124 which multiplies the two X input signals thereto to provide a resultant output signal $X^2$ at an output terminal 126. Similarly, the $Y_{in}$ signal at terminal 79 is amplified by an operational amplifier 128 and is provided at an output terminal 130. It is noted that the output at terminal 130 is 2Y representing an amplifier gain of 2. In the case of the $X_{in}$ signal, the amplifier 120 provided unity voltage gain. Multiplier 132 multiplies the two input signals to provide a resultant output signal $4Y^2$ at output terminal 134.

The signals X, $X^2$, 2Y and $4Y^2$ at terminals 122, 126, 130 and 134 respectively are utilized to generate further correction signal components. These signal components are generated by further multipling and summing at summing terminals of operational amplifiers. The second multiplier circuits 136, 140, 144, 148, and 152, provide at their respective output terminals 138, 142, 146, 150 and 154 the functions $X^3$, $YX^2$, XY, $XY^2$ and $8Y^3$. For clarity in the drawing, input signals to these multiplier circuits are referenced by the output terminal numbers 122, 126, 130 and 134 of the sources of the multiplier input signals. This reference numeral procedure is employed throughout FIG. 7. The signal component functions generated by the latter or second multiplier circuits are then further applied to a multiplier circuit 156, a summing operational amplifier 160, and to multiplier circuits 164 and 168 which provide at their respective output terminals 158, 162, 166 and 170 the correction signal components $X^2Y^2$, $(X^2+Y^2)$, $(X^2+Y^2)^2$, $(X^2+Y^2)^3$. The signals $X^2$ at terminal 126, $4Y^2$ at terminal 134, $X^3$ at terminal 138, $YX^2$ at terminal 142, XY at terminal 146, $XY^2$ at terminal 150, $8Y^3$ at terminal 154, $X^2Y^2$ at terminal 158 provide correction signal components for correcting the aforementioned geometric distortions. The signals $(X^2+Y^2)^2$ at terminal 166 and $(X^2+Y^2)^3$ at terminal 170 are applied to multiplier circuits 172, 174, 196 and 198 along with the X signal and 2Y signal in order to provide higher order corrective signal components. The output of multipliers 172 and 196 provide the 5th order correction signal components in the direction of the Y and X axis, respectively while the multipliers 174 and 198 provide the 7th order correction signal components in the direction of the Y and X axis, respectively. The aforementioned signals are applied to potentiometers 176–186 and the output of these potentiometers along with the outputs of the multipliers 172 and 174 are combined at a summing terminal 188 of an operational amplifier 190. The output of operational amplifier 190 is a composite correction signal for correcting edge bow, differential linearity, bow, rotation, trap, edge rotations, and the 5th and 7th order distortion in the direction of the Y axis. It is noted that the corrective signal component provided by the potentiometers 176–186 is adjustable in amplitude whereas the outputs of multipliers 172 and 174 are not. As is described hereinafter, these potentiometers are adjusted in order to provide a correction signal component amplitude for reducing a deviation determined to exist between the test and reference images. Fixed amplitude components of the aforementioned geometric correction signals are combined with two additional geometric correction signals. The latter comprise radial linearity and pincushion. This combination is accomplished at a summing terminal 192 of the operational amplifier 194. These potentiometers provide for adjustment of the amplitude of the radial linearity and pincushion corrective signal components which are included in the composite correction signal. The composite correction signal $C_y$ which is provided at the output terminal 86 of the operational amplifier 194 includes corrective signal components for each of the aforementioned geometric distortions as well as 5th and 7th order distortions. It is particularly noted that potentiometer adjustment of the signal component amplitudes for correcting geometric distortions are performed after multiplication is accomplished. Consequently, these adjustments are not interactive on the various signals prior to multiplication and adjustments can be made substantially without repetition.

Corrective signals for correcting the geometric and other distortions in direction of the X axis are similarly provided. The potentiometers 200-210 provide for an adjustment of the amplitude of the particular signal components indicated in FIG. 7. These signal amplitudes are combined at a summing terminal 212 of an operational amplifier 214 along with the 5th and 7th order corrective signal components from the multiplier circuits 196 and 198. Radial linearity and pincushion component adjustments are performed with potentiometers 213 and 215. As with the Y axis correction, fixed amplitude components of the geometric corrective signals are combined with radial linearity and the pincushion component and are summed at a summing terminal 216 of operational amplifier 218. The amplifier 218 provides a composite corrective signal $C_x$ at its output terminal 80 for correcting distortions in the direction of the X axis. While various circuit components can be utilized to implement the circuit arrangement of FIG. 7, in one embodiment not deemed limiting of the invention in any respect, the multiplier circuits indicated therein are formed by an integrated circuit multiplier identified as AD 534 which is available from Analog Devices of Norwood, Mass.

Figure 3:
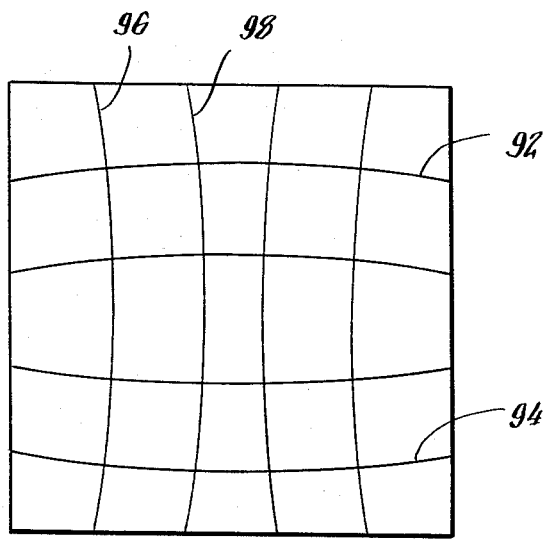
FIG. 3 is a view of a recording medium illustrating a test alignment image formed thereon.
Figure 4:
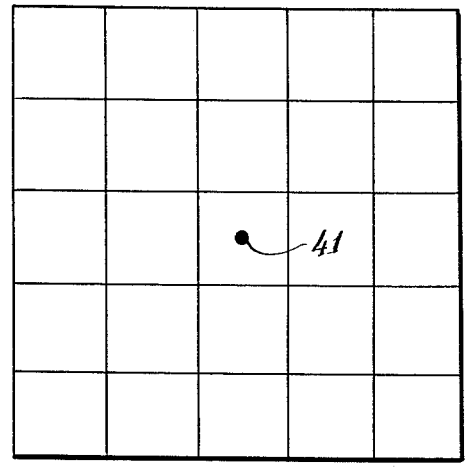
FIG. 4 is a view of a reference alignment image.
Figure 5:
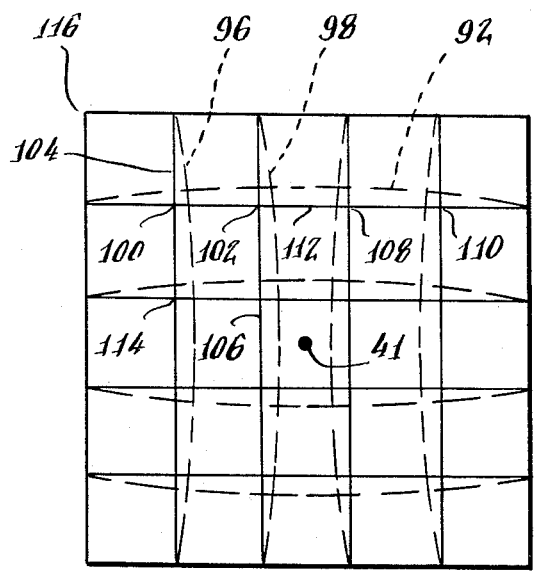
FIG. 5 is a view of the recording medium of FIG. 3 overlaying the reference alignment image of FIG. 4.

The deflection circuit arrangement (FIG. 6) excites the deflection yoke 40 and causes the beam 39 to scan the medium 32 in the X and Y direction. It is desirable that the scanning beam create an image on the medium 32 of a predetermined configuration. This configuration is comprised of a plurality of reference points. In another embodiment, the predetermined imaged figuration comprises a rectangular array of intersecting grid lines as illustrated in FIG. 4. This array has predetermined spacing between the horizontally and vertically extending lines so that each intersection is spaced from an adjacent intersection by a predetermined distance. For example, the grid lines of FIGS. 3 and 4 are each selected to provide 1 inch spacing between intersections. The array is formed by causing selective blanking of the beam 39 during predetermined portions of the trace, as illustrated in FIG. 3. Blanking is provided by a matrix configuration signal generator 64 (FIG. 6) which provides an output signal for alternatively enabling and blanking the beam at a beam intensity electrode of the electron gun. The matrix configuration generator is provided by a plurality of trigger and logical gate circuits which provide the desired enabling and blanking signal. Alternatively, the matrix configuration is generated and controlled by a data processor, not shown, having stored program and data for effecting the desired matrix configuration. The image configuration of FIG. 3 illustrates horizontal lines 92 and 94 and vertical lines 96 and 98. These lines are distorted and the distortion is exaggerated to aid in the description. The image configuration of FIG. 3 comprises a test alignment image of the apparatus 10 which is created in order to provide a permanent image for use in determining and examining distortions occurring in the trace. FIG. 4 illustrates a reference alignment image formed on a medium and which is highly linear and which, as described hereinafter, is used for determination of distortion. After the configuration of FIG. 3 is imaged on medium 32, the medium is removed from chamber 34 and is compared with the reference alignment image of FIG. 4 in order to accurately determine the deviations of the test image from the reference image. Although various procedures may be followed for making this determination, one preferred procedure provides for superimposing or overlaying the test alignment image of FIG. 3 over the reference alignment image of FIG. 4, as is illustrated in FIG. 5 and measuring the spatial deviations between the grid lines of the test and reference images at corresponding locations on the images. One of the mediums is partly transparent for viewing purposes. In this case, the medium of FIG. 3 is partly transparent so that the grid lines of the reference image can be viewed through the test medium. As an example, in FIG. 5, the determination is made at the intersection 100 and the successive intersection 102 of the test and reference lines 96, 104, and 98, 106 respectively. Similarly, the determination is made, for example, at intersections 108 and 110 by measuring the deviations at these intersections between the test trace line 92 and the reference line 112. As indicated, the distortions of FIG. 3 are exaggerated and in practice the measured deviations appear relatively small. While deviation measurement can be performed by comparing the test pattern image with the reference alignment image, it is also possible to determine the deviations of the test image by measurement in a coordinate measuring machine, such as the ACU-GAGE, Model 01-24 which is available from Ocean Industries of Londonderry, N.H., or with a Moore M-18R Universal Measuring Machine which is available from Moore Special Tool Company, Inc., of Bridgeport, Conn. This equipment generally provides for a microscopic examination of the test image where the coordinates of the predetermined image pattern are used as a reference alignment image to precisely determine the deviation from the predetermined pattern, and presents a visual display of the magnitude of the measured deviation at the selected intersection. It should be noted that the particular geometric distortion being examined is recognizable by practitioners in the art from the characteristic appearance of the trace lines in the test image and if not visually apparent will be recognized from the actually measured deviations as determined. Measured deviations are then identified as being caused by a particular geometric distortion and with a particular corrective function as earlier indicated. The deviations thus determined are then utilized to calculate the amplitude of the correcting signal component for the particular geometric distortion. Such determinations are not made for 5th and 7th order distortions.

The determination of the correcting amplitude for a measured deviation is exemplified by considering the distortions as to line 96 of the test image of FIG. 3. In practice, this distortion can be the composite of several of the aforementioned distortions. For example, the deviation in the single line scan 96 could contain representative deviations due to both bow and edge bow. In the example it is considered that the distortion is recognizable as bow in the X direction for line 96.

The correction function for X axis bow, from Table I above, is $Y^2$. Deviation at intersections 100 and 114, i.e., $D_{100}$ and $D_{114}$ are therefore proportional to $Y^2$ with $$D_{100} = KY^2_{100} \tag{1}$$

$$D_{114} = KY^2_{114} \tag{2}$$

As indicated previously, the matrix of the reference FIG. 4 has intersections of predetermined spacings as for example, one inch. This creates 1 inch incremental abscissa (X) and ordinate (Y) coordinates for the reference matrix intersections. If the upper left corner (116) of the reference matrix of FIG. 5 is designated as the point (0,0), then intersection point 100 of the same matrix would be identified by coordinates (1,1) and intersection 114 would be designated by coordinates (1,2) with $Y_{100}$ therefore equal to 1 and $Y_{114}$ equal to 2.

The displaced intersections of line 96 are now measured as described above. If $D_{100}$ and $D_{114}$ are each measured and their X values are found to be 1.001 inches and 2.004 inches, then the magnitude of the deviation from the reference matrix is determined for $D_{100}$ is 0.001 inch and for $D_{114}$ is 0.004. These values are obtained by subtraction of the $D_{100}$ reference intersection coordinates from the test intersection coordinates. With two equations and one unknown (k) we can now solve equations (1) and (2) for the average value of the unknown (k) by the method of simultaneous equations. Therefore, $$\begin{array}{r} .001 = k(1)^2 \quad (1) \\ + \underline{.004 = k(2)^2 \quad (2)} \\ .005 = k(5) \\ k = .001 = 1 \text{ mil} \end{array}$$

As indicated above the total distortion of line 96 may be the cumulative result of other distortions in addition to bow distortion. It is preferable for increased accuracy to also correct for these other recognizable distortions which are present. One method of accomplishing this is by repeating the above procedure individually for each contributing distortion until the test pattern configuration conforms substantially with the reference image. In practice, though, it is preferable to solve simultaneously for all the distortions contributing to deviations at each point. The deviation equation for deviation at the point $D_{100}$ is:

$$D_{100} = k_1(Y_1)^2 + K_2(X_1)^2(Y_1)^2 + K_3 X_1(Y_1)^2 \tag{3}$$

Where $(X_1)^2(Y_1)^2$ represents that error associated with edge bow, $X_1(Y_1)^2$ represents that error associated with pincushion, and so on for all of the errors recognizable. A solution for the line 96 is then derived by simultaneously solving a number of equations for the various intersections simultaneously for those unknowns.

As also indicated previously, yoke 40 exhibits a deflection sensitivity and the X and Y yoke deflection coils have a predetermined deflection characteristic. A current change $\Delta I$ amperes in the Y winding is proportional to a characteristic deflection (n in mils) at the medium 32. By reference to this characteristic, a change in deflection current $\Delta I$ required to cause a deflection distance of 1 mil of the beam 39 at the medium can be determined. The corresponding voltage change $E_{78}$ can be measured by coupling a voltmeter to terminal 78, FIG. 6, and monitoring the voltage change at this point. Adjustment of the potentiometer 180 (FIG. 7) associated with the geometric distortion (bow) provides the desired current change. The magnitude of this change is monitored a voltmeter coupled to terminal 78. Similar determinations of deviations are made for the other recognizable distortions and a change in the amplitude of the correction signal component for bringing about the correction is similarly calculated. These calculations for commercial applications are best effected automatically by a computer programmed to expeditiously solve the above equations for the corrections ($C_x$, $C_y$) that will result in eliminating geometric deviations.

An improved method and apparatus for enhancing scanning linearity and reducing geometric and high order distortions has thus been described. Distortions in scanning can be reduced to about 0.01% through use of this method and apparatus. This is accomplished with relatively economical correction circuit means. The method and apparatus are further advantageous in that the high fidelity is provided without the need for repetitive adjustment of circuit means. Substantial savings in time and equipment is thus accomplished.

While there has been described a particular embodiment of the method and apparatus of the invention, variations may be made thereto without departing from the spirit of the invention and the scope of the appended claims.

What is claimed:

1. In an electron beam recording apparatus having means for deflecting a charged particle beam in the X and Y direction therein, the method for improving the geometric fidelity of the reproduced image comprising the steps of:
    (a) positioning a charged particle sensitive medium in the path of a charged particle beam to retain a permanent image on said medium,
    (b) projecting the particle beam to form on said medium a test pattern having a predetermined configuration,
    (c) providing a reference alignment image,
    (d) dividing each of the $X_{in}$ and $Y_{in}$ signals into a plurality of non-interactive parallel correction circuits with each arranged to produce a correction signal for a predetermined spatial deviation shown on said medium,
    (e) comparing the deviation of the test pattern image with the reference alignment image for each of said predetermined spatial deviations, by measuring the deviations for a particular deflection distortion at a plurality of predetermined corresponding locations on said images,
    (f) adjusting each of the $X_{in}$ and $Y_{in}$ deflection signal functions in each of said circuits so that the correction signal from each circuit is that for which it was determined, and
    (g) combining the sum of the signals from each of said plurality of correction circuits and summing the same with the $X_{in}$ and $Y_{in}$ signal to produce total correction signals ($X_c$, $Y_c$) to the X and Y deflection means whereby the test pattern image aligns with said reference alignment image.

2. The method of claim 1 wherein said plurality of non-interactive adjustable correction circuits comprise potentiometers which are associated with correction signal components corresponding to predetermined deflection deviations which are corrected to adjusting the amplitude of the corresponding signal component by adjusting a particular potentiometer to provide a calculated correction signal, and monitoring the amplitude of change of the correction signal component while adjusting said potentiometer.

3. The method of claim 2 wherein said potentiometers are adjusted while providing means for precisely determining the magnitude of the change in the correction signal, and, adjusting the determination of the potentiometer until the magnitude of change corresponds to the correct value.

4. The method of claim 3 wherein a charged particle beam deflection circuit means is provided and the amplitude of the deflection drive signal is measured by a precision digital voltmeter while making said adjustment until said calculated correction value is attained.

5. The method of claim 1 wherein said beam is deflected to form a test pattern configuration having a plurality of precisely definable reference points to form said predetermined corresponding locations.

6. The method of claim 5 wherein said reference points are represented by a rectangular array of intersecting grid lines.

7. A method according to any one of the claims 1-6 wherein said adjusting step (f) includes a computer or other automated machine for calculating the correction signal for each of said predetermined spatial deviations.

8. A circuit arrangement for providing in a charged particle beam deflection apparatus having beam deflection means for deflecting a single charged particle beam upon the application of $X_{in}$ and $Y_{in}$ deflection signals thereto comprising:
  (a) a source of $X_{in}$ and $Y_{in}$ deflection signals,
  (b) circuit means coupling said $X_{in}$ and $Y_{in}$ signals to said beam deflection means for causing deflection of said charged particle beam,
  (c) a correction cirucit means for deriving $C_x$ and $C_y$ correction signals from $X_{in}$ and $Y_{in}$ input signals coupled thereto, said correction signals each having a plurality of individually generated correction signal components, each of said components corresponding to a predetermined deflection distortion function not limited to $KX^mY^n$ on a recorded image from said beam,
  (d) means for coupling said $X_{in}$ and $Y_{in}$ deflection signals to said correction circuit means,
  (e) said correction circuit means including separate and single function generating multiplier circuits means for deriving second and higher order signal components from said input ($X_{in}$, $Y_{in}$) signals and means for combining the derived multiplier signals to provide a plurality of correction signal components,
  (f) said correction signal components each further including a plurality of individual adjustable circuit members for varying the amplitudes of associated correction signal component,
  (g) said adjustable circuit members each coupled in the circuit at a location for varying the amplitude of said correction signal component after signal multiplication, and
  (h) means for combining said $C_x$ and $C_y$ correction signals respectively and said deflection signals.

9. The circuit arrangement of claim 8 wherein said correction circuit means comprises:
  (a) circuit means for providing first and higher order signal components from said first and second input signals $X_{in}$ and $Y_{in}$ respectively;
  (b) a first multiplier circuit means;
  (c) means coupling said first and higher order components to each of said first separate and single function generating multiplier circuit means for providing a plurality of output correction signal components from each of said multipliers each component associated with a scanning distortion not limited to $KX^mY^n$
  (d) (e) means for combining said plurality of correction signal components to provide said composite correction signals $X_c$ and $Y_c$, and
  (e) (f) adjustable circuit means coupled between said first multiplier circuit means and said signal combining means for adjusting the amplitude of said signal to the signal combining means.

10. The circuit arrangement of claim 9 wherein said correction circuit means comprises:
  (a) a second multiplier circuit means;
  (b) means for coupling said first and high order components and said output correction signals of said first multiplier means to each of said second separate and single function generating multiplier circuit means wherein said second multiplier circuit means multiplies single function terms together for providing higher order output correction signal components from each of said multipliers than is provided by said first multiplier circuit means; and
  (c) circuit means for coupling an output signal from said second multiplier circuit means to said signal combining means.

11. The apparatus of claim 8 including means coupled between said first multiplier circuit means and said signal combining means for applying correction signal components of fixed amplitudes to said signal combining means.

12. The circuit arrangement of claim 8 wherein said X and Y beam deflection signals deflect said particle beam respectively, said correction circuit means provides greater than third order correction signal components not limited to $KX^mY^n$ in said X and in said Y.

13. The circuit arrangement of claim 12 wherein said correction circuit means provides seventh order correction signal components not limited to $KX^mY^n$ in each of the X and Y directions.

14. The arrangement of claim 12 including a support surface for positioning said beam sensitive medium in the path of said deflected electron beam, said surface having a curvature thereof, and said circuit arrangement compensates for distortion introduced in an image formed on said medium as a result of the curvature in said support surface.

15. The arrangement of claim 14 wherein said curvature is generally convex.

16. In an electron beam recording apparatus having means for deflecting a charged particle beam in one direction therein, the method for improving the geometric fidelity of the reproduced image comprising the steps of:
  (a) positioning a charged particle sensitive medium in the path of a charged particle beam to retain a permanent image on said medium,
  (b) projecting the particle beam to form on said medium a test pattern having a predetermined configuration,
  (c) providing a reference alignment image, (d) dividing the deflection signal into a plurality of non-interactive parallel correction circuits with each arranged to produce a correction signal for a predetermined spatial deviation shown on said medium, (e) comparing the deviation of the test pattern image with the reference alignment image for each of said predetermined spatial deviations, by measuring the deviations for a particular deflection distortion at a plurality of predetermined corresponding locations on said images, (f) adjusting the deflection signal functions in each of said circuits so that the correction signal from each circuit is that for which it was determined, and (g) combining the sum of the signals from each of said plurality of correction circuits and summing the same with the deflection signal to produce a total correction signal to the deflection means whereby the test pattern image aligns with said reference alignment image.

17. The method of claim 16 wherein said plurality of non interactive adjustable correction circuit comprise potentiometers which are associated with correction signal components corresponding to predetermined deflection deviations which are corrected by adjusting the amplitude of the corresponding signal component by adjusting a particular potentiometer to provide a calculated correction signal, and monitoring the amplitude of change of the correction signal component while adjusting said potentiometer.

18. A method according to claim 17 wherein said adjusting step (f) includes a computer or other automated machine for calculating the correction signal for each of said predetermined spatial deviations.

19. A circuit arrangement for providing in a charged particle beam deflecting apparatus having single beam deflection means for deflecting a charged particle beam upon the application of a deflection signal thereto comprising;

(a) a source of the deflection signal, (b) circuit means coupling said deflection signal to said beam deflection means for causing deflection of said charged particle beam, (c) a correction circuit means for deriving a correction signal from the input signal coupled thereto, said correction signal each having a plurality of individually generated correction signal components, each of said components corresponding to a predetermined deflection distortion function not limited to $KX^mY^n$ on a recorder image from said beam, (d) means for coupling said deflection signal to said correction circuit means, (e) said correction circuit means including separate and single function generating multiplier circuits means for deriving second and higher order signal components from said input signal and means for combining the derived multiplier signals to provide a plurality of correction signal components, (f) said correction signal components each further including a plurality of individual adjustable circuit members for varying the amplitudes of associated correction signal component, (g) said adjustable circuit members each coupled in the circuit at a location for varying the amplitude of said correction signal component after signal multiplication, and, (h) means for combining said correction signals respectively and said deflection signal.

20. The circuit arrangement of claim 19 wherein said correction circuit means comprises:

(a) circuit means for providing first and higher order signal components from said input signal;

(b) a first multiplier circuit means;

(c) means coupling said first and higher order components to each of said first separate and single function generating multiplier circuit means for providing a plurality of output correction signal components from each of said multipliers each component associated with a scanning distortion not limited to $KX^mY^n$ (d) means for combining said plurality of correction signal components to provide a composite correction signal; and (e) adjustable circuit means coupled between said first multiplier circuit means and said signal combining means for adjusting the amplitude of said signal to the signal combining means.

21. The circuit arrangement of claim 20 wherein said correction circuit means comprises:

(a) a second multiplier circuit means;

(b) means for coupling said first and higher order components and said output correction signals of said first multiplier means to each of said second separate and single function generating multiplier circuit means wherein said second multiplier circuit means multiplies single function terms together for providing higher order output correction signal components from each of said multipliers than is provided by said first multiplier circuit means; and (c) circuit means for coupling an output signal from said second multiplier circuit means to said signal combining means.

22. The apparatus of claim 19 including means coupled between said first multiplier circuit means and said signal combining means for applying correction signal components of fixed amplitudes to said signal combining means.

23. In a correction circuit arrangement for providing in a charged particle beam deflection apparatus having a single source of deflection signals $X_{in}$ and $Y_{in}$ and deflection means for deflecting a charged particle beam upon the application for these deflection signals with circuit means for coupling said $X_{in}$ and $Y_{in}$ signals to said correction circuit and to said beam deflection means and an additional means for combining correction signals $C_x$ and $C_y$ respectively with $X_{in}$ and $Y_{in}$ for a composite correction deflection signal the improvement comprising:

(a) means for deriving $C_x$ and $C_y$ correction signals from $X_{in}$ and $Y_{in}$ input signals coupled thereto, said correction signals each having a plurality of individually generated correction signal components, each of said components corresponding to a predetermined deflection distortion function not limited to $KX^mY^n$ on a recorded image from said beam, said means including;

(b) a first multiplier circuit means;

(c) means coupling said first and higher order components to each of said first separate and single function generating multiplier circuit means for providing a plurality of output correction signal components from each of said multipliers each component associated with a scanning distortion not limited to $KX^mY^n$;

(d) means for combining said plurality of correction signal components to provide said composite correction signals $X_c$ and $Y_c$, (e) adjustable circuit means coupled between said multiplier circuit means and said signal combining means for adjusting the amplitude of said signal to the signal combining means;

(f) a second multiplier circuit means;

(g) means for coupling said first and higher order components and said output correction signals of said first multiplier means to each of said second separate and single function generating multiplier circuit means wherein said second multiplier circuit means multiplies single function terms together for providing higher order output correction signal components from each of said multipliers than is provided by said first multiplier circuit means;

(h) circuit means for coupling an output signal from said second multiplier circuit means to said signal combining means; and (i) means coupled between said first multiplier circuit means and said signal combining means for applying correction signal components of fixed amplitude to said signal combining means.

* * * * *